United States Patent [19]

Tatsuo

[11] Patent Number: 5,203,890
[45] Date of Patent: Apr. 20, 1993

[54] DEAERATOR FOR REMOVING DISSOLVED OXYGEN IN WATER

[76] Inventor: Okabe Tatsuo, 10-5 Minami-Honcho, Funabashi-shi Chiba-ken, Japan

[21] Appl. No.: 562,760

[22] Filed: Aug. 6, 1990

[30] Foreign Application Priority Data

Aug. 7, 1989 [JP] Japan .................................. 1-92193

[51] Int. Cl.⁵ .............................................. B01D 19/00
[52] U.S. Cl. ........................................... 55/164; 55/39; 55/52; 55/55; 55/194
[58] Field of Search ................ 55/39, 52, 55, 164, 55/194; 122/406.1

[56] References Cited

U.S. PATENT DOCUMENTS

| | | | |
|---|---|---|---|
| 1,511,876 | 10/1924 | Ehrhart | 55/194 X |
| 1,618,424 | 2/1927 | Gibson | 55/194 |
| 1,910,088 | 5/1933 | Cherry | 55/194 X |
| 2,668,598 | 2/1954 | Seed | 55/194 X |
| 2,977,962 | 4/1961 | Zucker | 55/55 X |
| 3,116,999 | 1/1964 | Armbruster | 55/55 X |
| 3,206,917 | 9/1965 | Kaiser et al. | 55/194 X |
| 3,853,500 | 12/1974 | Gassmann et al. | 55/164 X |

Primary Examiner—Richard L. Chiesa
Attorney, Agent, or Firm—Klauber & Jackson

[57] ABSTRACT

With the purpose of removing dissolved oxygen in feed water, deaerator including a deaerating tank with a relatively simple structure is provided inside or outside the water tank. By creating a vacuum zone in the deaerating tank, dissolved oxygen in water is gasified and separated from water to inhibit and prevent the formation of rust in the water tank, water supply pipings, etc.

3 Claims, 2 Drawing Sheets

DEAERATOR FOR REMOVING DISSOLVED OXYGEN IN WATER

BACKGROUND OF THE INVENTION

1. Field of the Invention

This invention relates to the method for removing dissolved oxygen in water by deaeration, as well as to the deaerating apparatus with which the method is practised.

2. Description of the Prior Art

Plugging of water supply pipings and contamination of the supplied water, which are caused by rusting of the pipings or water tanks, are commonplace problems in ordinary office buildings, apartment houses, etc. Among various factors promoting the rust formation in the water supply system, dissolved oxygen concentration in water appears to be the most important. For example, lowering of the dissolved oxygen concentration to half results in nearly doubled time required for rust formation of the same degree. In other words, there is an approximately proportional relation between the dissolved oxygen concentration and growth rate of the rust. Consequently, formation or growth of rust can be substantially inhibited by removing the dissolved oxygen.

Practically, however, prevention or inhibition of rust formation by removing the dissolved oxygen is not adopted in water supply systems for ordinary office buildings, apartment houses, etc. Instead, troublesome cleaning operations for removing rust formed in the water supply system are conducted periodically or at need.

According to prior operation, the dissolved oxygen is removed by means of vacuum deaerator equipped with ejector, or deaerator utilizing vacuum pump in conjunction with membrane.

But these conventional apparatuses such as the vacuum deaerator equipped with ejector and deaerator utilizing vacuum pump in conjunction with membrane are costly and not easily applicable to ordinary houses and apartment houses, because they not only require relatively sophisticated controlling technique but consume large quantity of electric power for the operation.

SUMMARY OF THE INVENTION

In view of these conditions, this invention has the object to provide a method and apparatus for removing dissolved oxygen in water by deaeration, the to inhibit formation or growth of rust in water supply systems by means of a simply constructed apparatus which is easy to control.

The foregoing object of this invention is accomplished by a method wherein water is led to a vacuum zone created inside or outside the water tank to gasify the dissolved oxygen. The gasified oxygen is subsequently separated and removed. According to this invention, the removal of dissolved oxygen takes place in a deaerating apparatus comprising a deaerating tank provided inside or outside the water tank and equipped with water intake nozzles for introducing water from the water tank into the deaerating tank, exhaust system for exhausting separated oxygen collected in the upper part of the deaerating tank through a vacuum pump and a check valve, and circulating system for recycling the deaerated water to the water tank.

In more detail, a deaerating tank equipped with circulating system comprising a pump and exhausting system comprising a vacuum pump is provided inside and outside the water tank. By controlling the inflow of water into the deaerating tank through the intake nozzles and the outflow of the deaerated water through the circulating system, a vacuum zone is created in the deaerating tank. Dissolved oxygen in water supplied through the intake nozzles is gasified and separated from water in accordance with Henry's law that solubility of a gas at a definite temperature is proportional to pressure of the gas, and the separated dissolved oxygen is collected in the upper part of the deaerating tank and then exhausted to the outside.

The aforementioned objects, advantages, characteristics and uses of this invention will be apparent from the following description and the attached drawings.

DESCRIPTION OF THE PREFERRED EMBODIMENTS

Preferred embodiments of this invention are hereinafter described in detail with reference of the attached drawings. For reasons of convenience, the embodiments will be described laying stress on an example of the deaerator having a deaerating tank provided inside the water tank, and method for deaerating water in the water tank will be mentioned at need.

EXAMPLE 1

Figure 1:
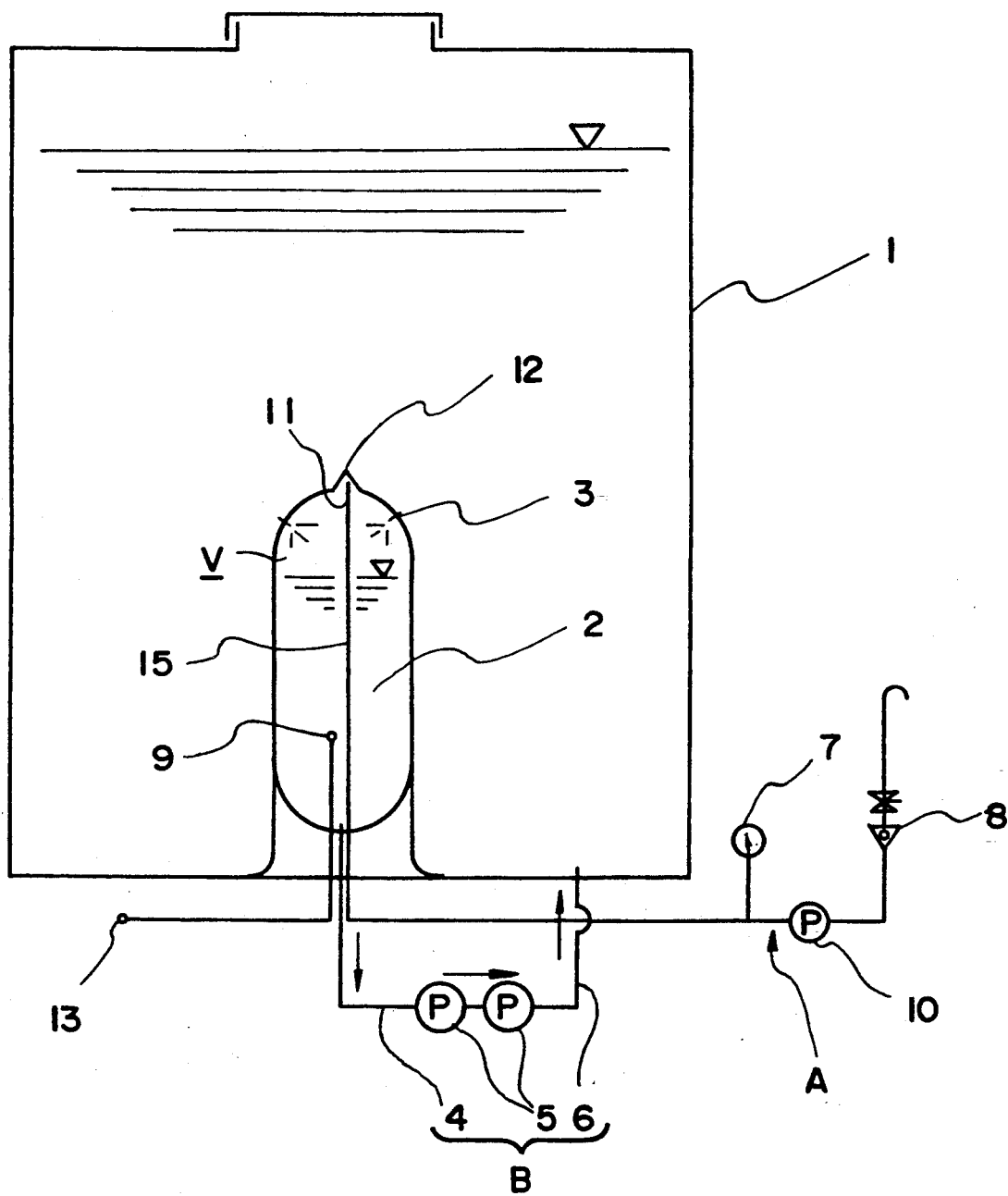
FIG. 1 is a diagrammatic illustration of an example of the deaerator with a deaerating tank provided inside the water tank.

FIG. 1 is a diagrammatic illustration of the deaerator provided inside a water tank.

The water tank (1) is an overhead water tank installed on the rooftop of office building, etc., and (2) is the deaerating tank provided near the bottom inside the overhead water tank (1). To the upper part of the deaerating tank (2), a plurality of the water intake nozzles (3) are attached for the purpose of introducing water in the overhead water tank (1) directly into the deaerating tank (2).

The downcast pipe (4) is a pipe connecting bottom of the deaerating tank (2) with the pump (5), while the recycling pipe (6) is a pipe through which water delivered by the pump (5) is recycled to the overhead water tank (1). These components in aggregate constitute the water circulating system (B).

One end (11) of the exhaust pipe (15) is inserted into the top cone (12) of the deaerating tank (2), while the other end is open to the atmosphere through the vacuum pump (10), the check valve (8) and another valve. These components in aggregate constitute the exhaust system (A). A vacuum gauge (7) is attached to the exhaust pipe (15).

The deaerating tank (2) is equipped with a level sensor (9) to detect the water level in the deaerating tank (2), and magnet switch (13) controlled by the level sensor (9) is connected with power source which is not illustrated herein.

The deaerator is operated as follows. First, water supply nozzles (3) are adequately adjusted so that the water inflow rate is smaller than the discharge of the pump (5). Before the startup, the overhead tank (1) is filled with water. The deaerating tank (2) is also filled with water introduced through the water supply nozzles (3). Air in the deaerating tank (2) is discharged through the exhaust system (A), and is easily replaced by water. This continues until the deaerating tank (2) is completely filled with water, when inflow of a small quantity of water into the exhaust pipe (15) is detected and the check valve (8) is closed. Then the pump (5) is operated to discharge water in the deaerating tank (2) through the downcast pipe (4) (circulating system (B)). The level of water in the deaerating tank (2) is forcibly lowered and, consequently, a vacuum zone (V) is created therein. By this vacuum zone (V), dissolved oxygen in water is gasified and separated from water in accordance with Henry's law and is collected in the upper part of the deaerating tank (2). When the separated oxygen is accumulated in the upper part of the deaerating tank (2), the vacuum pump (10) linked with the vacuum gauge (7) is started to discharge the separated oxygen via the inlet end (11) of the exhaust pipe through the check valve (8) into the outside air. The deaerated water is recycled through the recycling pipe (6) to the overhead water tank (1). Because the water inflow through the water supply nozzles (3) is less than the discharge of the pump (5), the level of water in the deaerating tank lowers gradually until the lowered level is detected by the level sensor (9). The pump (5) is then stopped by the magnet switch (13), and the deaerating tank (2) is again filled with water introduced through the water supply nozzles (3).

By repeating the above-described cycle, water in the overhead water tank (1) is replaced with the deaerated water, and rust formation in the water-supply pipings is inhibited.

If water in the overhead water tank (1) decreases to a level lower than the water supply nozzles (3) and air is introduced into the deaerating tank (2) through the water supply nozzles (3), the level of water in the deaerating tank (2) is also lowered. When the lowered level is detected by the level sensor (9), the magnet switch (13) cuts off a power source not shown in the drawing to stop the motor (5). Thus, damage of the pump (5) caused by racing is prevented.

Further, by inserting the inlet end (11) of the exhaust pipe into the top cone (12) of the deaerating tank (2), efficient exhaust of the separated oxygen is ensured, and premature inflow of the deaerated water into the exhaust pipe (15) is prevented to maintain the exhaust system (A) in a stable condition.

EXAMPLE 2

Figure 2:
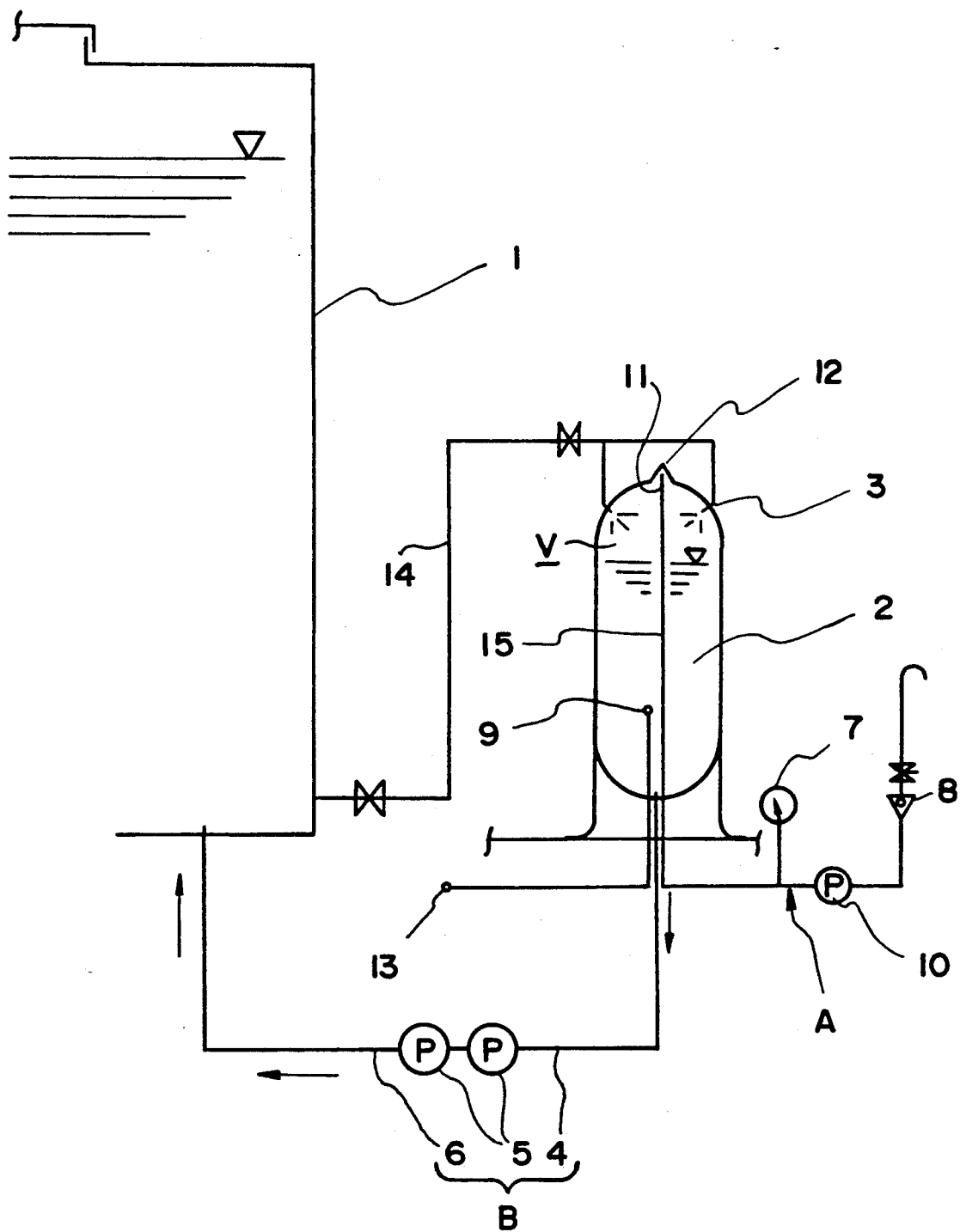
FIG. 2 is a diagrammatic illustration of another example of the deaerator with a deaerating tank provided outside the water tank.

FIG. 2 is a diagrammatic illustration of the deaerating tank provided outside a water tank, in contrast to the example of FIG. 1 has the deaerating tank inside the water tank.

The deaerating tank (2) is provided outside the overhead water tank (1). The water supply nozzles (3) fitted to the external deaerating tank (2) are connected with a water supply pipe (14) through which water is supplied from the overhead water tank (1) to the deaerating tank (2).

Because other structural and functional aspects are similar to those of Example 1, description is not repeated. Common components are marked with identical numbers or symbols.

Though this invention is illustrated, in the foregoing and the following description, with examples of application to overhead water tanks, it is obvious to those familiar to this technical field that this invention is not limitative to the herein described embodiments but involves wide variety of water tanks such as reservoir, etc.

As described above, the method for removing dissolved oxygen in water by deaeration, as well as the deaerator for practicing the same, neither needs a special pump nor consumes unreasonably large quantity of electric power. With a relatively simple system in which a vacuum zone is ingeniously incorporated, dissolved oxygen in the feed water is effectively removed to inhibit rusting of water supply pipings, etc., at lower energy costs.

The system of the present invention permits extensive saving of the maintenance costs which would be needed for the cleaning of rusted water supply equipment or the replacement of rusted pipes.

Moreover, the present invention is advantageously applicable to an already constructed water supply system. By connecting the deaerator of the present invention to an already constructed water supply system, rust already formed in the system will be reduced to highly stable triiron tetroxide film. In other words, rust, which formerly caused plugging of the pipings and contamination of the feed water, is converted to protective layer which not only prevents contamination of the feed water but also lengthens life of the water supply pipings.

When the deaerating tank is provided inside the water tank, the deaerating tank can be installed without being restricted by place. As described above, the present invention has many technical and economical advantages.

What is claimed is:

1. A deaerator for removing dissolved oxygen from water in a water tank, comprising a deaerating tank provided inside the water tank, a plurality of water supply nozzles pointing downward and attached to the deaerating tank with the purpose of introducing water from the water tank into the deaerating tank, an exhaust system for exhausting oxygen collected in the upper part of the deaerating tank via a vacuum pump and a check valve, and a circulating system, for recycling the deaerating water to the water tank through a pump, said deaerator being further comprised of a top cone provided at the top of the deaerating tank to contain the inlet end of an exhaust pipe; and wherein the deaerating tank is equipped with a level sensor to detect the level of water held therein.

2. A deaerator for removing dissolved oxygen in water, comprising a deaerating tank provided outside of the chamber of a water tank, a plurality of water supply nozzles attached to the deaerating tank and pointing downward for introducing water from the water tank into the deaerating tank, an exhaust system from exhausting oxygen collected in the upper part of the deaerating tank comprised of a vacuum pump and a check valve, and a circulating system for recycling the deaerated water to the water tank comprised of a pump; wherein the deaerator is further comprised of a top cone which is located at the top of the deaerating tank and which contains the inlet end of an exhaust pipe; and wherein the deaerating tank is further comprised of a level sensor to detect the level of water held in the deaerating tank.

3. A deaerator for removing dissolved oxygen gas from water in a water storage tank, comprised of:

(a) a deaerating tank contained within the water storage tank or located outside of the storage tank, said deaerating tank having a top cone for collecting oxygen gas;
(b) a water supply system comprised of a pipe ad at least one water supply nozzle for removing water from the storage tank and downwardly introducing water into the deaerating tank through the at least one nozzle;
(c) an exhaust system for exhausting oxygen gas collected in the deaerating tank to the atmosphere, comprised of a vacuum pump, an exhaust pipe connected to the deaerating tank and having an inlet end located in the top cone of the deaerating tank, and a check valve for controlling flow through said exhaust pipe;
(d) a circulating system for returning deaerated water to the water storage tank, comprised of a pump and a recycling pipe; and
(e) a water level sensor and activator for determining the water level within the deaerating tank and activating the water supply system to introduce water from the water storage tank into the deaerating tank.

* * * * *